(12) United States Patent
Lohr (10) Patent No.: US 6,956,450 B1
(45) Date of Patent: Oct. 18, 2005

(54) DEVICE FOR NON-CONTACT TRANSMISSION OF ELECTRICAL SIGNALS AND/OR ENERGY

(75) Inventor: Georg Lohr, Eichenau (DE)

(73) Assignee: Schleifring and Apparatebau GmbH, (DE)

( * ) Notice: Subject to any disclaimer, the term of this patent is extended or adjusted under 35 U.S.C. 154(b) by 0 days.

(21) Appl. No.: 09/331,226

(22) PCT Filed: Jan. 5, 1998

(86) PCT No.: PCT/DE98/00512

§ 371 (c)(1),
(2), (4) Date: Jul. 30, 1999

(87) PCT Pub. No.: WO98/29919

PCT Pub. Date: Jul. 9, 1998

(30) Foreign Application Priority Data

Jan. 3, 1997 (DE) .................................. 197 00 110
Jan. 16, 1997 (DE) .................................. 197 01 357

(51) Int. Cl.[7] .............................................. H01P 1/06
(52) U.S. Cl. .................... 333/261; 333/257; 333/24 R
(58) Field of Search .............................. 333/24 R, 175, 333/176, 256, 257, 261

(56) References Cited

U.S. PATENT DOCUMENTS 4,730,224 A * 3/1988 Komatsu ..................... 360/64

* cited by examiner

Primary Examiner—Stephen E. Jones
(74) Attorney, Agent, or Firm—St. Onge Steward Johnston & Reens LLP (57) ABSTRACT

A device for non-contact transmission of electrical signals or energy between two parts mobile relative to each other comprising electromagnetic near-field coupler elements on the two parts, wherein the coupler elements on at least one part form a cascade circuit terminated in a manner substantially free from reflection, and each coupler element is an independent resonance system having a resonance frequency higher than a highest frequency of wide-band signals to be transmitted. An alternatively structured device in which each coupler element on one part includes an element that resonates independently and has a resonance frequency approximately equal to the frequency of signals or energy to be transmitted including developments in which the coupler elements operate on differential signals, or analyzer means determine the spacing between the two parts, or at least one part comprises symmetrical lines for supplying differential energy signals to two coupler elements.

37 Claims, 6 Drawing Sheets

DEVICE FOR NON-CONTACT TRANSMISSION OF ELECTRICAL SIGNALS AND/OR ENERGY

This applicaiton claims the benefit of the filing date of PCT/DE98/00512 filed Jan. 5, 1998, which claims the benefit of the filing date of German Applicantion Nos. 197 00 110.6 filed Jan. 3, 1997 and 197 01 357.0 filed Jan. 16, 1997.

FIELD OF THE INVENTION

The present invention relates to device for non-contact transmission of electrical signals and/or energy between at least two parts mobile relative to each other, wherein a plurality of defined electromagnetic coupler elements is provided on at least one part, which have a near field inducing the non-contact transmission.

Such devices are used for the transmission of electrical signals or electrical energy, respectively, between two or more parts mobile relative to each other. This movement may be a rotating, a translational or a combined movement.

For the sake of easy understanding a distinction is not made in the present description between the transmission among mutually mobile units and a stationary unit and units mobile relative thereto because this is only a question of local relationship and does not take any influence on the operating mode of the inventive device. Equally, a further distinction is not made between the transmission of signals and the transmission of energy because the operating mechanisms are identical.

PRIOR ART

In units adapted for a translational and particularly linear movement, such as hoisting and conveyor systems, and in rotatable units such as radar installations or computer tomographs it is necessary to transmit electrical signals or energy between mutually mobile units or between one stationary unit and at least one other unit arranged for movement relative thereto.

Whenever the relative speed of the units is comparatively high, for instance, it is expedient to provide a non-contact transmission. Compared against a contacting transmission, e.g. by means of sliding contacts, a non-contact transmission presents additional advantages when high data rates are to be communicated in the transmission of digital signals or when large bandwidths are required for the transmission of analog signals:

In conventional (circular) slip rings the diameter of the slip ring limits the maximum frequency which can be transmitted. This level is reached when the periphery of the Slip ring corresponds to half the wavelength of the signals to be transmitted.

Devices for non-contact transmission of signals or electrical energy are known in the most different configurations. In this respect reference is made to the commonly known textbook by Meinke/Gundlach "Taschenbuch der Hochfrequenztechnik" [Vademecum of High-Frequency Technology], Springer-Verlag, Berlin, 1968, page 186 (Resonant Transmitters).

A device supported on this basis and serving for non-contact transmission of electrical signals and/or energy between at least two parts mobile relative to each other, from which the introductory clause of Patent claims 1 or 3 starts out from, is known from the German Patent DE 42 36 340 C2. In the system for inductive transmission of energy in the range of medium frequencies from a primary coil disposed on a stator to a consumer equipped with at least one secondary coil, which is known from that prior art document, the primary coil consists of series-connected coils arranged in groups, with one capacitor being connected in series per group. All the groups are connected each in parallel to a medium-frequency distributing line, with the impedances of each group of coils and the respective capacitor being so dimensioned that in the event of an inductive coupling of one group to one of the mobile consumers the resonance condition is satisfied at least approximately for this group.

Even though that known device is very well suited for transmitting electrical energy, it is not appropriate for the wide-band transmission of electrical signals due to the fact that it operates as Resonanzübertrager. Moreover, as a result of the three-dimensional arrangement of the coils, it cannot be employed at operating frequencies in the MHz range and above. This precludes an application in computer tomographs, for instance.

A device for the transmission of electrical signals between two parts which are mobile and particularly rotatable relative to each other along a path and to which a transmitter or a receiver system is connected, and which is particularly intended for application in computer tomographs, is known from the German Patent DE 33 31 722 A1. That known device comprises coupler elements on each part, whereof each includes at least one electrode so that the signal will be capacitively transmitted via the respective opposite electrodes.

That device, which originates from the year 1983, entails, however, also the disadvantage that it is not suitable for transmitting signals with a bandwidth which is required at present for computer tomographs, because reflections occur already at low frequencies on the coupler elements. Even though the use of separate amplifiers for each coupler element would be a remedy the use of a great number of amplifiers would result in very high costs.

Furthermore the structure via the open coupler elements results in a very high electromagnetic noise radiation.

The laid-open German Patent Application DE-OS 26 53 209 discloses a coaxial multiple rotating coupler for the transmission of high-frequency energy, wherein coupler elements in the form of capacitor plates are used as well, which are permanently engaged by 100%. This structure results actually in a reflection-free and hence wide-band termination.

On the other hand, the structure of the rotating coupler is complex and hence expensive, particularly when the system should have a wide diameter, e.g. of the size required in computer tomographs.

The German Patents DE 44 12 958 A1 and DE 195 33 819 A1 disclose largely similar devices and methods for a communication at a high data rate, particularly in a computer tomograph system.

To this end, for instance in a computer tomograph, electrical energy is coupled out from a transmission line by means of a coupler, with the line as such assuming the coupler function, i.e. produces the same effect as a leakage line in communications engineering. In this respect reference is made to the aforementioned textbook by Meinke/Gundlach, page 304 (reference word: coupled lines).

These known devices do hence not comprise a plurality of defined coupler elements but merely a strip line so that they appertain to a general type which is different from the type which the introductory clause of Patent claims 1 or 3 starts out from. The disadvantage of such strip lines is the wideband emission of high-frequency energy from the line serving as a coupler:

The lines have a length of up to 4 m, for instance in computer tomographs, and of a multiple thereof in conveyor systems. Therefore it operates as a emitter with a very low lower limit frequency in the event of a slight mismatching already. Due to its extension it is moreover highly sensitive to external noise. This noise is received from the line and communicated to all the other units.

The shield described in the German Patent DE 195 33 819 A1 results only in a slight improvement. Instead of the attenuation by 55 dB at maximum, as described there, a wide-band attenuation by 10 dB with peaks of 20 dB has been determined only in tests.

Another disadvantage of these known methods and devices consists in the aspect that in the event that signals are coupled into the line by the units adapted for relative movement, only a little amount of energy can be transmitted. For improvement of the coupling provisions the surface of the line ought to be enlarged. But this results in a low line impedance and hence in an increased sensitivity to noise.

BRIEF DESCRIPTION OF THE INVENTION

The present invention is based on the problem of providing a device for non-contact transmission of electrical signals and/or energy between at least two parts adapted for movement relative to each other, which will present a low responsiveness to noise at a large bandwidth or high possible data rates.

One inventive solution to this problem is defined in the parallel Patent claims 1 and 33. Improvements of the invention are the subject matters of the dependent claims.

In the inventive approach defined in claim 1 each of the coupler elements, which are provided on at least one part, contains at least one resonator which consists of a single element able to resonate per se and independently of the other coupler elements. The resonant frequency of the resonator or resonators, respectively, is approximately equal to the frequency of the signals to be transmitted. The individual resonators are interconnected via a line which is terminated in a reflection-free manner. It is thus possible to transmit the signals or the electrical energy to be transmitted, respectively, with a high efficiency at comparatively low losses due to emission. At the same time, the structure of the inventive device is a simple and hence low-cost design. The resonance of the individual resonators may be a serial or parallel resonance.

This provision minimises the interfering emission via the conductor structure.

Claim 2 defines various non-limiting but preferred conceivable resonator designs. One particularly preferred possibility, in addition to the resonant cavities, electric, ferromagnetic and/or piezoelectric resonators, is the application of line resonators because these are simple to design and hence low-cost and which are mainly easy to control.

These line resonators may, for instance, have a comb-shaped arrangement of conducting surfaces on an isolator, with the comb-shaped arrangement being terminated by a defined wave resistor so that, compared against prior art, a wider three-dimensional extension will be possible. This arrangement offers the additional advantage that it is a simple and hence low-cost design which can be implemented on a "printed circuit board".

There the coupler element, e.g. in the form of a short line section, constitutes a resonator which has particularly expedient coupling properties at its resonant frequency. Such resonators may also be line transformers which provide for impedance matching of the coupler means to the line system. For matching the bandwidth and the quality of resonator systems to the respective transmission project the resonators may be attenuated or may be resonators combined with each other, which are tuned to different resonant frequencies.

In another embodiment of the invention the coupler elements are designed as coupling lines capable of resonating. These are line segments which are not screened and exclusively serve the purpose of coupling.

One alternative solution to the problem defined in accordance with the present invention is defined in Patent Claim 3. In that approach the coupler elements constitute a conductor structure configured as cascade circuit on at least one part, which is provided with a reflection-free termination. Moreover, each coupler element is a resonance system independent of the other coupler elements on that part, which has a resonance frequency higher than the highest frequency of the wide-band signals to be transmitted.

In the present invention a "resonance system" or the "capability to resonate" is to be understood to apply to a resonance which can be used for signal transmission or filtering, respectively.

Within the scope of the present invention a "cascade circuit" is to be understood to apply to the general case of a circuit quadrupoles but not to a plain series or parallel circuitry. One example of a cascade circuit is the case where the joining coupler element taps the voltage or the current on at least one dummy element of the preceding coupler element as input signal.

In particular, the system formed by the coupler elements may display a low-pass characteristic. The line system has hence conducting properties at low frequencies and presents a very high attenuation at high frequencies so that the inventive device displays a very high resistance to noise. The term "low frequencies" is to be understood here as a frequency band usable for the transmission of signals, which may be within the range up to several 100 MHz to GHz. What is essential of the invention here is the fact that the dimensioning enables the selection of a frequency band useful for the transmission, e.g. between 0 and 300 MHz, whilst frequencies above this frequency band are strongly suppressed.

In any case it is preferred that the conductor structure in its entirety is not able to resonate. This means that the resonators—rather than the conductor structure—have a resonance frequency within the frequency band used for transmission.

For instance, a conductor structure with a length of 100 metres, which includes the resonators having a resonant frequency of 300 MHz, had a resonance at roughly 3 MHz as such. This resonance should not be used for the communication of information and is expediently suppressed.

This minimises the interfering emission via the conductor structure.

In both inventive solutions the parts mobile relative to each other are coupled by means of a plurality of defined electromagnetic coupler elements which are connected to each other by means of a line or a conductor structure having a reflection-free termination, i.e. which has a defined and matched wave resistance. Thus the disadvantage of a direct influence on the line, which does exist in prior art, is avoided.

Hence the line system can, inter alia, be optimised as means for signal transmission and each of the coupler elements can be optimised separately as means for signal coupling. The line system may consist here of a single line or even of a plurality of inter-connected lines which may also be connected in correspondence with prior art.

A symmetrical structure of the system is preferred.

In the most general case coupling can be implemented by electromagnetic fields and waves and particularly in an inductive and/or capacitive manner. In specific embodiments it is also possible to provide for coupling via merely electrical or magnetic fields.

It is moreover preferred that each coupler element able to resonate consists of one element which contains at least one inductive element and one component producing a capacitive effect.

In particular, each coupler element may consist of a single inductor and a single capacitor. This solution is particularly simple in engineering terms and requires only a low dimensioning expenditure. In this case it is also possible to determine a specific type of coupling. In the embodiment implemented by means of capacitors the coupling is realised predominantly by electrical fields whilst in the embodiment using inductors, by contrast, it is implemented by magnetic fields. It is also possible, of course, to use coupler elements including resonance circuits of a higher order in which two capacitors, for instance, are connected by two inductors connected in parallel.

The individual inductors of the different coupler elements of one part are preferably connected in series—which a single inductor is used per coupler element—so that the limit frequency of the low-pass system can be easily set to the desired frequency, particularly within the range from 100 to 10,000 MHz. The inductors connected in series hence form the conducting structure themselves so that they do not require any distributing lines as is the case in prior art.

It is furthermore an advantage for the aforementioned frequency range if a continuous and particularly a "straight" line forms the individual inductors.

In any case, the inductors or capacitors may be configured as structures of a printed circuit board so that a particularly simple and low-cost structure is achieved which moreover enables a simple matching with the respective geometry of the parts moving relative to each other.

This purpose is also served with the provision that the printed circuit board is a flexible board because such a board can be easily formed into almost any shape whatsoever—particularly when it presents a specific geometry, e.g. slots. The use of a slotted printed circuit board is, by contrast, naturally not possible in the case of strip lines.

In the design of the inventive device with a printed circuit board it is moreover possible that the capacitors are configured as flat conducting elements on the (flexible) circuit board. The flat conducting elements may be connected to the continuous line via branch lines or joined directly to the line laterally. It is moreover possible that flat conducting elements are provided on either side of the continuous line.

It is possible in particular to provide conducting structures including a ground surface, capacitors and/or inductors on either side of the printed circuit board.

It is, of course, also possible that the inductors and/or capacitors are discrete elements. Even a combination of discrete elements and elements implemented on a printed circuit board is possible.

In another embodiment of the invention several coupler elements tuned to different frequency ranges are arranged in a close three-dimensional relationship so that a coupler structure is achieved which is tuned to these frequency ranges. With this provision both a wide-band transmission and a multi-channel transmission in several independent frequency bands is possible. This furnishes a coupler structure which enables selective coupling in these predetermined frequency ranges. In an installation, for instance, which operates in the frequency ranges of 100 MHz and 900 MHz, a combination of discrete resonant circuits for the lower frequency band as well as of line resonators for the upper frequency band may be used. On account of such a combination an increased noise suppression can be achieved in the range between these two frequency bands.

In a further embodiment of the invention several coupler elements are so combined with each other that a predetermined radiated field pattern will be obtained outside. This may be done in correspondence with the commonly known rules for the dimensioning of antennas and groups of emitters. The radiation of undesirable energy into particularly sensitive areas can hence be minimised.

The design in which the coupler elements are configured as differential coupler elements and in which a differential signal is applied to the coupler elements enables a signal transmission with a particularly high resistance to noise.

To this end at least two coupler elements must be supplied with differential signals from two lines carrying differential signals or via a symmetrical matching circuitry such as a balance transformer.

In the inventive device coupler elements able to resonate may be provided on all parts, which are matched with each other. It is moreover also possible that coupler elements capable of resonating are provided merely on one part and that conventional transmitters or receivers, respectively, are provided on the other parts as coupler elements. The transmitters or receivers may comprise, for instance, coils, ferrite cores and/or capacitors.

Moreover, the conventional coupler elements may be configured as antennas (emitters) in correspondence with prior art. These antennas can be configured, for instance, as planar antennas with a strip-line design or as rod antennas or frame antennas.

In an advantageous embodiment of the invention the coupler elements presenting the inventive design are arranged on the transmitter side and conventional coupler elements are disposed on the receiving side in the event of a preferred direction of signal flow. Such a preferred signal flow direction is involved, for instance, when exactly one transmitter and at least one receiver are provided or when a transmission quality as high as possible is demanded in precisely one direction. A combination along the path inventive coupler element—coupler element—line system—coupler element—inventive coupler element displays the lowest transmission quality. Here the coupling attenuations of the transition from the conventional coupler element to the inventive coupler element as well as the losses occur twice in the line system. The combination conventional coupler element—inventive coupler element—line system is better because in such a case the losses induced by the transition from the conventional coupler element to an inventive coupler element occur only once. Best, however, is the combination line system—inventive coupler element—conventional coupler element because in such a case the non-amplified signal merely increases the attenuation of the path coupler element—. The signal attenuated by this attenuating factor (e.g. 10 dB) can hence be amplified again directly in the conventional coupler element. In the line system the original signal is still carried at the high level. Along the reverse signal path (conventional coupler element—inventive coupler element—line system) the attenuated signal is guided in the line system where it may be interfered with more easily by other signals on account of its lower level. This consideration leads to the conclusion that the best quality in transmission of a signal can be achieved along the path line system—inventive coupler element—conventional coupler element.

In the inventive device it is moreover expedient to shield line systems serving to feed the signals or the energy to be transmitted or to transmit the transmitted signals or the energy, and to design them hence in a form de-coupled from the coupler elements so that the emission via the feeder systems and the reception of noise energy will be minimised. In correspondence with the invention one embodiment of the device is so sufficient that the coupler elements account for the predominant share in the coupling function. A low remaining coupling of the mobile coupler means with the line system is normally not detrimental. And yet, in certain cases, it may be sensible to shield the line completely. This applies particularly when only a narrow-band coupling into the line is desired and high noise levels occur within a wide band in the environment.

It is moreover possible to provide at least one activator unit which activate the respective coupler element on the approached part only when the coupler element of a relatively moved part approaches the respective coupler element.

In another advantageous embodiment of the invention the operating range of the coupler elements is matched with the respective transmission task. In the event of resonators used as coupler elements one can dimension them in such a way that they reach their rated resonance frequency only when coupler elements with certain dielectric or magnetic properties are approaching which are provided on a relatively moving part. With this provision the advantage is achieved that energy is released only when these coupler elements are approaching.

When the coupler elements are further remote, for instance in the event of a resonator, the resonator is de-tuned, does not radiate any energy and does not load the line system. A de-tuned resonator is equally not able to couple energy into the line system at its operating frequency. Moreover, the coupler elements may be so designed that they can be tuned to different operating ranges when different coupler means are approaching. For instance, coupler elements provided on a relatively moving part, which have different relative permittivities, are suitable to tune the coupler elements to different operating frequencies.

In a further expedient embodiment of the invention the coupler elements comprise an activator means which determines the approach of a coupler means and activates the respective coupler element in the event of approach.

In another embodiment of the invention the coupler elements are coupled to the line system by additional active or passive components. Such components may be semiconductors in the form of switches or even amplifiers which control the signal flow and/or raise the signal level. Passive components for coupling may be directional couplers which permit the signal flow into the coupler elements, e.g. in the case of unidirectional transmission from the line system, but keep outside noise, which is coupled in by the coupler elements, away form the line system. This applies also in the case that coupler elements are configured as directional couplers. For de-coupling non-reciprocal components such as circulators may be employed, too, of course.

In a further embodiment of the invention different types of coupler elements are combined with each other. For instance, at one point of the system a wide-band transmission with capacitive coupler elements may be required whilst at another point in a noise-troubled environment a narrow-band transmission with resonators is necessary.

It is moreover possible that the coupler elements are shielded by a shield of electrically conductive material. This shield may comprise the coupler elements with or even without the line system or parts thereof. The shield produces its best effect when it encompasses the coupler elements as far as possible.

An inductive or capacitive transmitter means supplementing a resonant circuit displays its optimum transmission characteristics exclusively at the point of the resonant frequency. In accordance with the present invention the circuit is hence supplemented to form a power oscillator in which the resonant circuit used for transmission is the frequency-determining circuit element. It is irrelevant in such a configuration whether the resonant circuit of the transmitter element is a series or a parallel circuit. It can also be configured with further additional dummy elements so as to form a multi-circuit system able to resonate. What is essential is the fact that the transmission system is so designed that it can be excited to oscillate by combined coupling for oscillation on at least one resonant frequency of the system at which transmission of energy is possible.

The arrangement consists of an amplifying element which supplies the resonant transmitter means. A signalling means determines a signal which contains at least one phase information, based on currents and voltages of the resonance elements, and signals this information to the amplifying element. For the achievement of an oscillatory structure a switching or amplifying component is required in this arrangement which provides for an amplification such that the resonance condition (cf. Tietze, Schenk: "Halbleiterschaltungstechnik" [semiconductor technology], Springer-Verlag, $10^{th}$ edition, p. 459) will be satisfied. The aspect whether the switching or amplifying component is designed here as a mere semiconductor switch or as a linear amplifying element does not take any influence on the function of the inventive arrangement. Therefore a distinction will not be made in the further text between a switch and an amplifier.

In a particularly advantageous embodiment of the invention the signalling means comprises a power tap which couples out a predetermined percentage of the resonance current in the event of a series resonance. This power tap may be a current meter resistor, a power transformer or a Hall element. The resonance current can equally be measured as voltage drop on one of the resonant elements.

In a further expedient embodiment of the invention the signalling means comprises components for coupling a predetermined share of the voltages out which are applied to the parallel resonant circuit, in the event of parallel resonance. These voltages can also be determined indirectly via the current flowing through these elements.

In another advantageous embodiment of the invention the signalling means comprises components for determining the combination of a predetermined percentage of at lest one parallel resonance voltage or a predetermined share of at least one series resonance current in the case of a multi-circuit resonance system. The signalling means can be designed in this case such that the analysis will be performed by a simple addition, free from phase errors, of these magnitudes. With this provision it is possible to have the circuit operate at series or parallel resonance, depending on the respective load case. As an alternative also a reversing switch is possible which recognises whether a series or a parallel resonance is involved and which determines a share of the resonance voltage or the resonance current, respectively, in correspondence therewith.

In a further expedient embodiment of the invention the signalling means comprises filter elements for a pre-selection between the collection of the resonance voltage or the resonance current.

In a further advantageous embodiment of the invention the signalling means comprises a secondary oscillator which facilitates the commencement of oscillation of the system when the supply voltage is turned on. It is common that upon turn-on of the supply voltage an oscillator begins to oscillate from the noise condition. To ensure a reliable and rapid start of the oscillation such an oscillator can also receive a starting signal at a predetermined frequency. When this frequency is selected in the vicinity of he desired operating frequency the oscillation commences particularly rapidly. In the case of several possible resonances, too, the oscillation can take place at the desired resonance frequency when the starting signal is determined. If in such a case the oscillator started to oscillate from the noise condition it may be that the power oscillator also starts to oscillate to undesirable resonance frequencies.

In another expedient embodiment of the invention a further analyser unit is provided which uses the operating frequency of the circuit as such for determining the spacing between the parts movable relative to each other. With the operating frequency varying as a function of the mutually mobile elements in the case of an inductive transmission the corresponding variation of the distance can be easily determined on the basis of the operating frequency.

BRIEF DESCRIPTION OF THE DRAWINGS

The invention will be described in more details in the following with reference to the drawing wherein.

DESCRIPTION OF EMBODIMENTS

In the following figures the same reference numerals have been used to denote identical elements or elements producing the same effects so that partly a repeated discussion may be omitted here.

Figure 1:
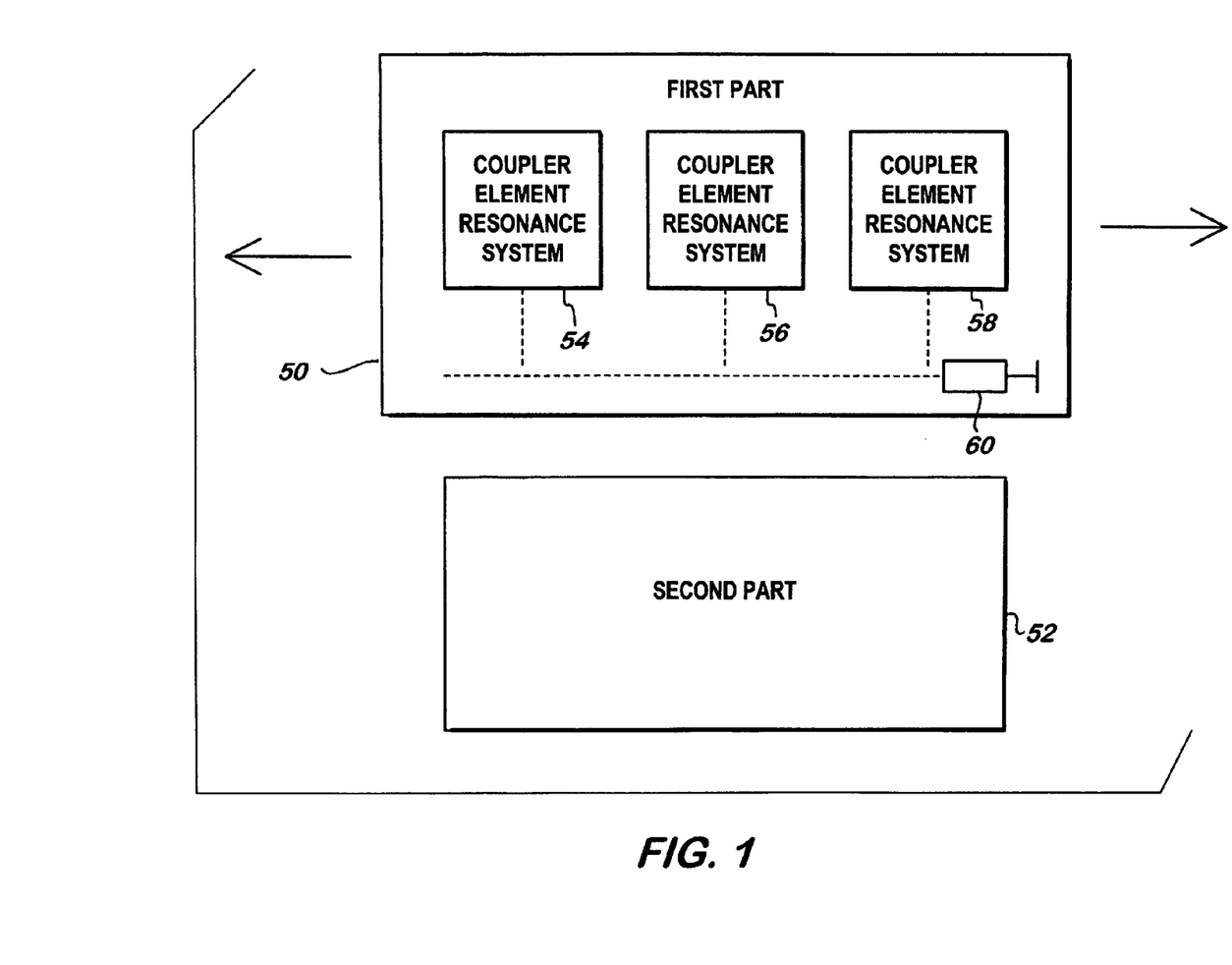
FIG. 1 is a block diagram illustrating the present invention.

FIG. 1 illustrates an advantageous embodiment of the present invention including first part 50 and second part 52. First part 50 includes a plurality of coupler elements 54, 56, 58. Coupler elements 54, 56, 58 comprise a conductor structure configured as a cascade circuit, which is provided with a termination 60 to minimize signal reflection. Each coupler element illustrated on first Part 50 is configured as a resonance system independent of each of the other coupler elements on first part 50, which has a resonance frequency higher than the highest frequency of the wide-band signals to be terminated. It should be noted that while coupler elements 54, 56, 58 are shown in first part 50, they may alternatively be located in second part 52. It is only necessary that they are provided on at least one of the parts.

Figure 1A:
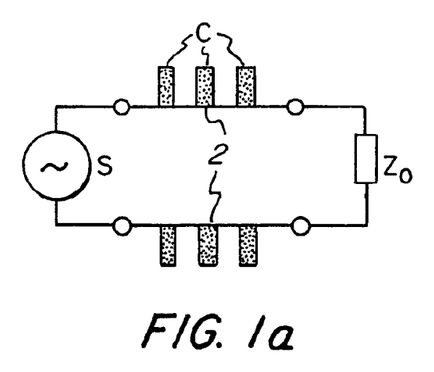
FIGS. 1a to 1c show the fundamental structure of inventive devices for non-contact transmission of electrical signals and/or energy.
Figure 1B:
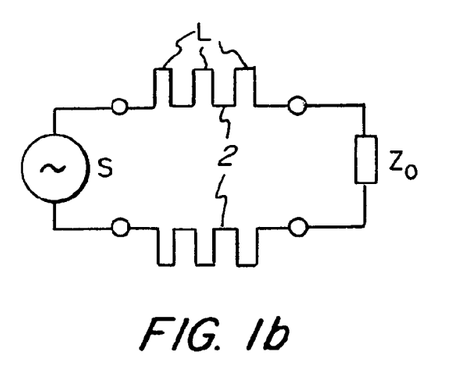
Figure 1C:
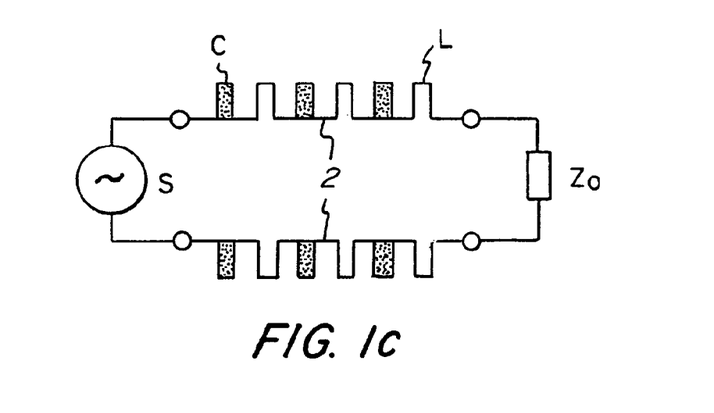

FIGS. 1a to 1c show various embodiments of the inventive device for non-contact transmission of electrical signals and/or energy, with the transmitter only being represented in the Figures, rather than the receiver as well.

A signal source S is connected via a conductor structure 2 to coupler elements C or L, respectively, and are furthermore terminated by a surge impedance $Z_0$ in a manner free from reflection. When a unit of the inventive structure is used as receiver the transmitted signal is tapped at the position of the signal source S. The arrangements illustrated here present a symmetrical or balanced configuration because here a particularly expedient embodiment is involved. Unbalanced or non-symmetrical embodiments are, of course, conceivable as well.

FIG. 1a shows an example of capacitive coupling; in this case flat conducting elements C, which induce the capacitive coupling, are connected to a continuous conductor 2 via a branch line or directly as in the embodiment illustrated here.

FIG. 1b illustrates an example of inductive coupling; here the conductor structure 2 forms loops and hence discrete elements L which create the inductive coupling.

FIG. 1c is the view of an example of inductive and capacitive coupling; in this case both the conductor loops L and flat conducting elements C are provided.

The invention will be explained in more details in the following with reference to the other Figures.

Figure 2:
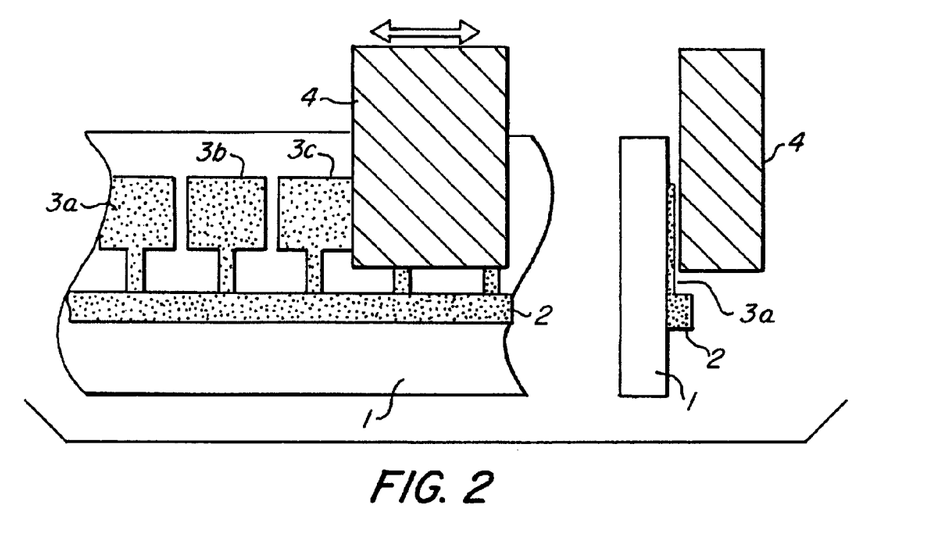
FIG. 2 illustrates a first embodiment of the invention which comprises a capacitive coupling system.

FIG. 2 shows an embodiment with capacitive coupling in a non-symmetrical design. On a carrier 1, e.g. a printed circuit board which may be flexible in particular, a conductor structure or a line network 2 is provided which interconnects the capacitive coupler elements 3a, 3b, and 3c.

Electrical signals and/or energy are transmitted by means of these coupler elements and by a coupler means 4 which serves as receiver and which is mobile relative to these coupler elements. The coupler means 4 can, of course, involve elements of a similar design but also conventional receivers. In the illustrated iembodiment—here reference is made to the side view in FIG. 2—the coupler means 4 is a conventional receiver which is disposed at the side of the coupler elements 3a to 3c. A ground surface may be optionally provided on the rear side of the printed circuit board.

Figure 3:
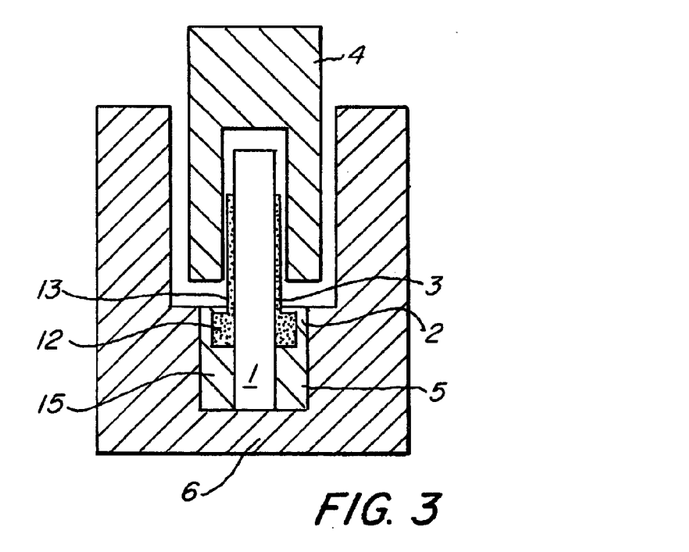
FIG. 3 shows a variant of the embodiment illustrated in FIG. 2, which comprises a balanced system with shielding.

FIG. 3 is a cross-sectional view of a variant of the embodiment illustrated in FIG. 2, wherein a symmetrical arrangement with a shielding is provided. The device comprises a balanced line system or a balanced line structure, respectively, which consists of a first conductor 2 and a second conductor 12. These conductors supply capacitive coupler elements 3 and 13.

The coupler means 4 is designed here as a balanced coupler means which surrounds the printed circuit board 1 in a U-shaped configuration, on which the conductor structures and the coupler means are arranged. Furthermore, a shielding 6 is provided to surround the entire arrangement. The carrier 1, which may be a printed circuit board again, is fastened on the shield 6 by means of isolators 5 and 15.

Figure 4:
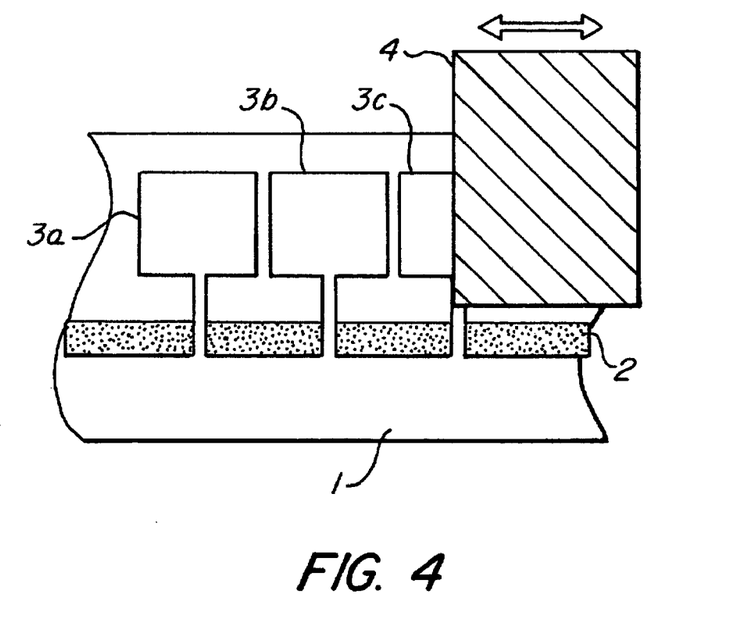
FIG. 4 is a view of a second embodiment with an inductive coupling system.

FIG. 4 is a view of a second embodiment of the invention wherein an inductive coupling is realised. On a carrier 1, which may also be provided with an electrically conductive layer on the rear side, a conductor structure 2 is provided, too, which connects inductive coupler elements 3a to 3c.

The coupler elements 3a to 3c are configured here in the manner of a conductor loop. The reference numeral 4 denotes again a coupler means of the conventional type.

The inventive device of which an exemplary description has been given above with reference to FIGS. 1 to 4 presents a number of advantages as will be explained in more details below, with reference being made to FIGS. 5 to 7.

Figure 5:
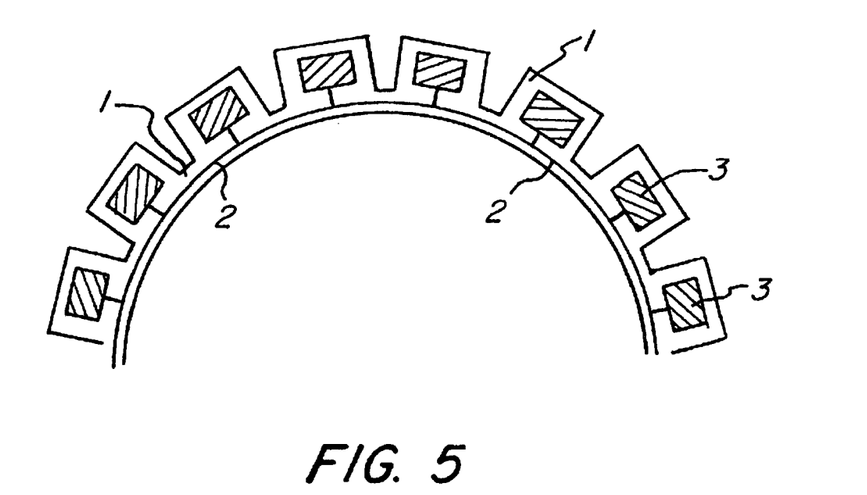
FIG. 5 illustrates an inventive device on a rotary transformer.

FIG. 5 shows an embodiment wherein the inventive device is so configured that it may be mounted on a rotary transformer, for instance. The conductor structure 2 having the inventive design with capacitive elements 3 (and/or inductive elements) may be made of a plane film or foil or the printed circuit board 1 in which slots are produced so as to allow for bending to small radii. This were impossible with a strip line as it is common in prior art.

Moreover, the inventive device presents the advantage that with a bent arrangement and with a differential signal coupling only slightly different line lengths are obtained which lead to differences in delay times and hence in signal noise and undesirable radiation. The inventive device is thus particularly well suitable for the transmission of differential signals, which entails the further advantage that the radiation to the outside is minimised due to the fields in the outside space which compensate each other practically almost completely.

Figure 6A:
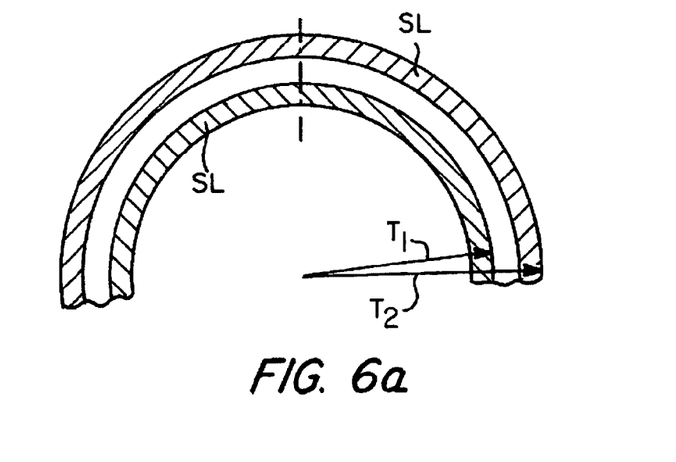
FIGS. 6a and 6b show a comparison between a prior art device and an inventive device in differential signal transmission.
Figure 6B:
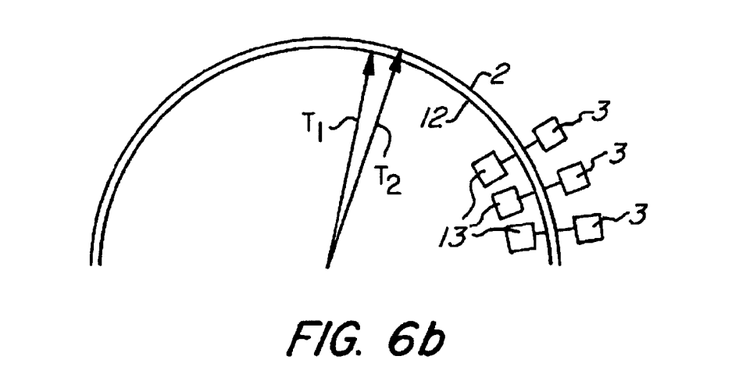

FIG. 6 shows a comparison between conventional strip lines SL designed as differential structure (figure section a) and an inventive device (figure section b).

As becomes apparent from FIGS. 6a and 6b the lines 2 and 12 with coupler elements 3 and 13 are disposed very close to each other in the case of an inventive device so that the difference of their radii $r_1$ and $r_2$ is very small and hence the difference in delay times becomes comparatively great.

Figure 7A:
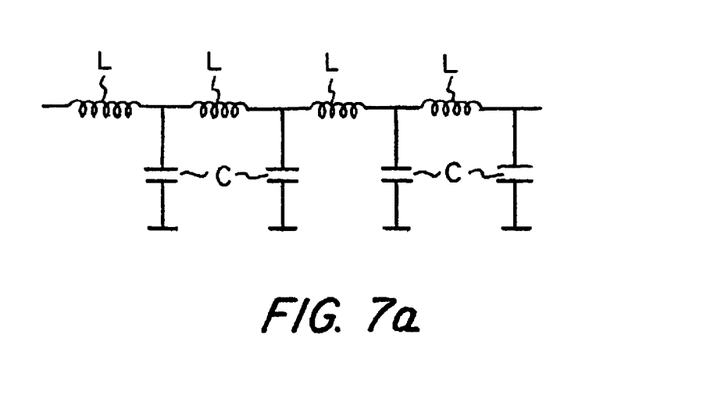
FIGS. 7a and b are illustrations for explanation of the low-pass characteristic.

FIG. 7a shows a simplified electrical equivalent circuit diagram of an inventive device. As is shown in FIG. 7a, the inventive device presents a low-pass characteristic. Thus the inventive device entails the advantage of a high resistance to noise because any noise above the threshold frequency will not be passed on and can hence neither be received nor emitted.

Figure 7B:
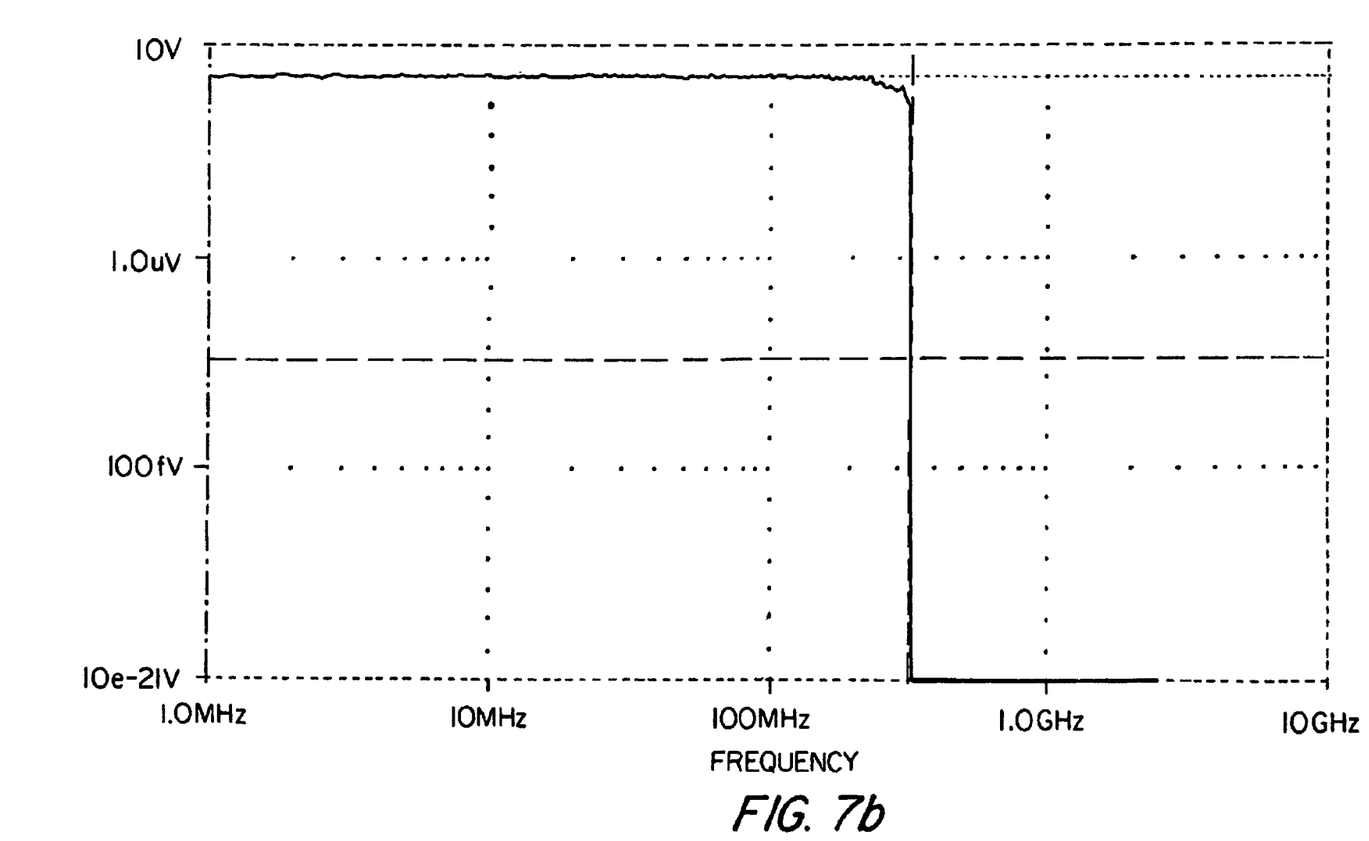

FIG. 7b is an exemplary illustration of the computed frequency response of an inventive device, wherein the frequency is plotted (in MHz) along the abscissa and the received signal (in V) is plotted on the ordinate. As is apparent here the inventive device presents a practically constant frequency response between 1 MHz and almost 300 MHz, which steeply drops to "zero" at roughly 300 MHz in the illustrated embodiment. Threshold frequencies other than 300 MHz—be they higher or lower—can, of course, be implemented as well. The present invention has so far been described by exemplary embodiments without any restriction of the general inventive idea and general applicability. In particular, it is possible to employ the invention not only for rotary transmission systems such as in computer tomographs, radar towers etc. but also for transmission systems adapted for linear movement such as those required on cranes etc. Moreover, the invention may be use in transmission systems performing a composite movement.

What is claimed is:

1. Device for non-contact transmission of electrical signals or energy between at least two parts mobile relative to each other, comprising a plurality of defined electromagnetic coupler elements provided on the at least two parts between which signals or energy is to be communicated, with a near field of the coupler elements causing the non-contact transmission; wherein said coupler elements on at least one part form a conductor structure configured as a cascade circuit which is terminated in a manner free from reflection; and each coupler element, independently of other coupler elements, is a resonance system having a resonance frequency higher than a highest frequency of wide-band signals to be transmitted.

2. Device according to claim 1, wherein said parts mobile relative to each other perform a translational movement.

3. Device according to claim 1, wherein said parts mobile relative to each other perform a rotational movement.

4. Device according to claim 1, wherein a system formed by said coupler elements has a low-pass characteristic.

5. Device according to claim 1 wherein said conductor structure in its entirety is not capable of resonating.

6. Device according to claim 1, wherein each coupler element able to resonate comprises an element including at least one component producing an inductive and capacitive effect, and a following coupler element taps a voltage or a current from at least one reactive element of a preceding coupler element as an input signal.

7. Device according to claim 6, wherein each coupler element is composed of at least one inductance and at least one capacitor.

8. Device according to claim 7, wherein individual inductances of various coupler elements of one part are connected in series.

9. Device according to claim 8, wherein a continuous conductor line forms the individual inductances of the coupler elements.

10. Device according to claim 9, wherein the capacitors are configured as flat conducting elements which are connected to said continuous conductor line via branch lines or directly joined to the conductor line laterally.

11. Device according to claim 10, wherein flat conducting elements are provided on either side of said continuous conductor line.

12. Device according to claim 6, wherein said components producing an inductive and capacitive effect are configured as structures of a printed circuit board.

13. Device according to claim 12, wherein said printed circuit board is a flexible board.

14. Device according to claim 13, wherein said printed circuit board is provided with slots.

15. Device according to claim 12, wherein conductor structures with a grounded surface, capacitors and/or inductors are provided on either side of a printed circuit board.

16. Device according to claim 6, wherein said components producing an inductive and capacitive effect are discrete elements.

17. Device according to claim 1, wherein a plurality of coupler elements tuned to different frequency ranges are disposed to be spatially close to each other to provide a coupler structure which is tuned to these frequency ranges.

18. Device according to claim 17, wherein said coupler structure is symmetrical.

19. Device according to claim 1, wherein said coupler elements are shielded from the environment by a shield made of an electrically conductive material.

20. Device according to claim 1, wherein coupler elements provided on all parts are able to resonate and are matched with each other.

21. Device according to claim 1, wherein coupler elements on one part are able to resonate, and coupler elements on other parts are conventional coupler elements.

22. Device according to claim 21, wherein the conventional coupler elements are selected from the group consisting of coils, ferrite cores, capacitors and antennas.

23. Device according to claim 1, wherein line systems serving to supply or pass on transmitted signals or energy are shielded from said coupler elements.

24. Device according to claim 1, wherein the coupling of said coupler elements to a line system serving to supply transmitted signal or energy is performed by active or passive devices such as amplifiers or semiconductor switches.

25. Device according to claim 1, wherein said coupler elements are designed to have electrical characteristics which are adjusted to an operating point only by dielectric or magnetic characteristics of an approaching coupler element.

26. Device according to claim 1, wherein signals or energy are supplied to said coupler elements by a switching or amplifying element.

27. Device according to claim 26, wherein a signaling means is provided which generates a regenerative coupling signal for said switching or amplifying element from voltages and currents of the resonators, such that an oscillation will occur on at least one resonance frequency.

28. Device according to claim 27, wherein said signaling means is so configured that it couples out one magnitude proportional to one part of a series resonance current.

29. Device according to claim 27, wherein said signaling means is so designed that it couples out one magnitude proportional to one part of a parallel resonance voltage.

30. Device according to claim 27, wherein in the case of several resonances said signaling means is so designed that it couples out a combined signal consisting of a magnitude proportional to a series resonance current and proportional to a parallel resonance voltage.

31. An apparatus for non-contact transmission of electrical energy between a first movable part and a second stationary part comprising:
at least two electromagnetic coupler elements provided on one of the two parts;
each coupler element having a resonance system;
said at least two electromagnetic coupler elements forming a conductor structure comprising a cascade circuit, which is terminated such that signal reflections are substantially eliminated;
wherein each resonance system comprises a single element which resonates independent of the other resonance system at a resonant frequency that is higher than a highest frequency of the transmitted electrical energy.

32. The apparatus according to claim 31 further comprising:
a second coupler element positioned on the part opposed to the part said at least two coupler elements are positioned on;
an activator unit provided with said second coupler element, said activator unit activating one of the at least two coupler elements when the second coupler element moves into proximity with one of the at least two coupler elements.

33. The apparatus according to claim 31 further comprising a electrical energy source wherein at least one of the two parts comprises a conductor structure having a symmetrical configuration with a first and a second line coupled to the electrical energy source.

34. The apparatus according to claim 33 wherein the first and second lines supply electrical energy to at least a first coupler element and to at least a second coupler element, the electrical energy comprising differential signals.

35. Device for non-contact transmission of electrical signals or energy between at least two parts mobile relative to each other, comprising:
a plurality of defined electromagnetic coupler elements provided on the at least two parts between which signals or energy is to be communicated, with a near field of the coupler elements causing the non-contact transmission;
each coupler element provided on at least one part comprises at least one resonator including a single element which is able to resonate per se and independently of the other coupler elements, and which has a resonance frequency approximately equal to the frequency of the signals or energy to be transmitted, and
the individual resonators are connected to each other via a line which is terminated in a manner free from reflection;
wherein an analyser means is provided which determines the operating frequency of the system and derives therefrom a signal in correspondence with the size of the spacing of said parts adapted to be moved relative to each other.

36. An apparatus for non-contact transmission of electrical energy between a movable part and a stationary part comprising:
at least two coupler elements provided on one of the two parts;
each coupler element having a resonator;
a line coupling each of said resonators to each other, said line being terminated such that signal reflections are substantially eliminated;
an electrical energy source where at least one of the two parts comprises a conductor structure having a symmetrical configuration with a first and a second line coupled to the electrical energy source;
wherein each resonator comprises a single element which resonates independent of the other resonators at a resonant frequency that is approximately equal to a frequency of the transmitted electrical energy; and
wherein the first and second lines supply electrical energy to at least a first coupler element and to at least a second coupler element, the electrical energy comprising differential signals.

37. Device for non-contact transmission of electrical signals or energy between at least two parts mobile relative to each other, comprising:
a plurality of defined electromagnetic coupler elements provided on the at least two parts between which signals or energy is to be communicated, with a near field of the coupler elements causing the non-contact transmission;
each coupler element provided on at least one part comprises at least one resonator including a single element which is able to resonate per se and independently of the other coupler elements, and which has a resonance frequency approximately equal to the frequency of the signals or energy to be transmitted, and
the individual resonators are connected to each other via a line which is terminated in a manner free from reflection;
wherein said coupler elements are configured as differential coupler elements and a differential signal is applied to said coupler elements.

* * * * *